United States Patent [19]

Shanes

[11] Patent Number: 5,138,656
[45] Date of Patent: Aug. 11, 1992

[54] INTERCOM WITH TRANSDUCER ENCLOSURE TO ATTENUATE RESONANT FREQUENCIES

[76] Inventor: Abraham Shanes, 5013 N. Kedzie Ave., Chicago, Ill. 60625

[21] Appl. No.: 708,981

[22] Filed: May 31, 1991

[51] Int. Cl.⁵ .................. H04M 9/08; H04M 9/10
[52] U.S. Cl. .................................... 379/167
[58] Field of Search ............ 379/167, 453, 440; 381/83

[56] References Cited

U.S. PATENT DOCUMENTS

| | | |
|---|---|---|
| 2,177,769 | 10/1939 | Erickson . |
| 3,030,446 | 4/1962 | Briggs ................ 379/167 |
| 3,135,349 | 6/1964 | Lahti . |
| 3,430,728 | 3/1969 | Dunning . |
| 3,867,996 | 2/1975 | Lou . |
| 4,008,374 | 2/1977 | Tiefenbrun . |
| 4,127,751 | 11/1978 | Kinoshita . |
| 4,161,995 | 7/1979 | Pohlmann et al. . |
| 4,167,985 | 9/1979 | Dunlavy . |
| 4,213,515 | 7/1980 | Laupman . |
| 4,281,738 | 8/1981 | Jackson . |
| 4,439,644 | 3/1984 | Bruney, III . |
| 4,805,728 | 2/1989 | Carter et al. . |
| 4,923,032 | 5/1990 | Nuernberger . |

Primary Examiner—Stafford D. Schreyer
Attorney, Agent, or Firm—Wood, Phillips, VanSanten, Hoffman & Ertel

[57] ABSTRACT

An intercom system has a speaker or two-way transducer with a sound attenuation enclosure to minimize oscillation.

23 Claims, 4 Drawing Sheets

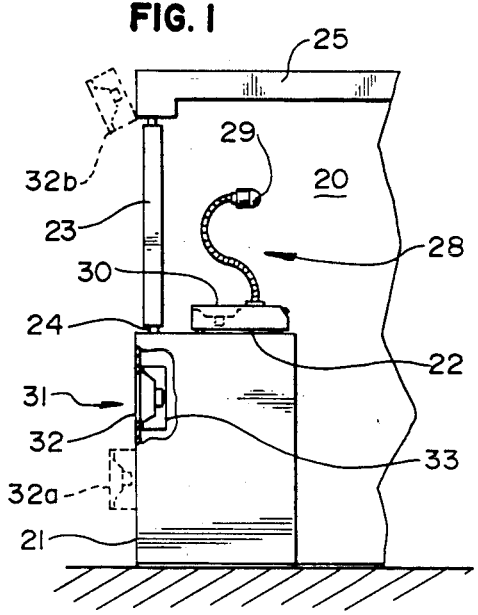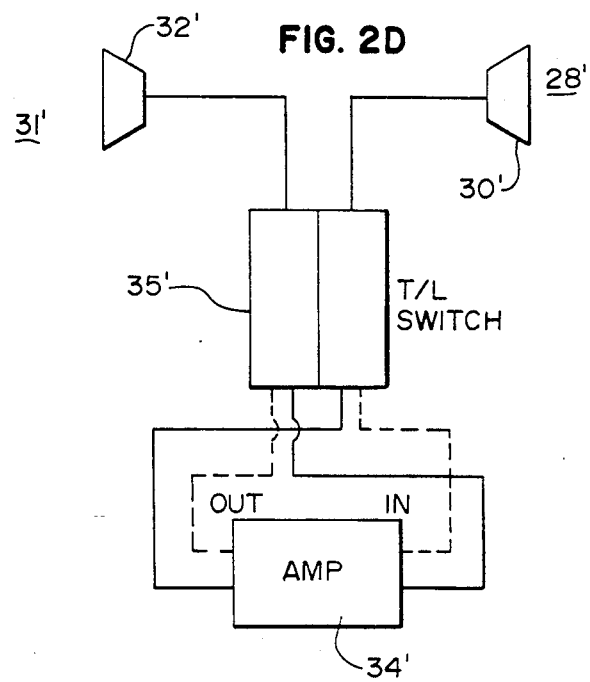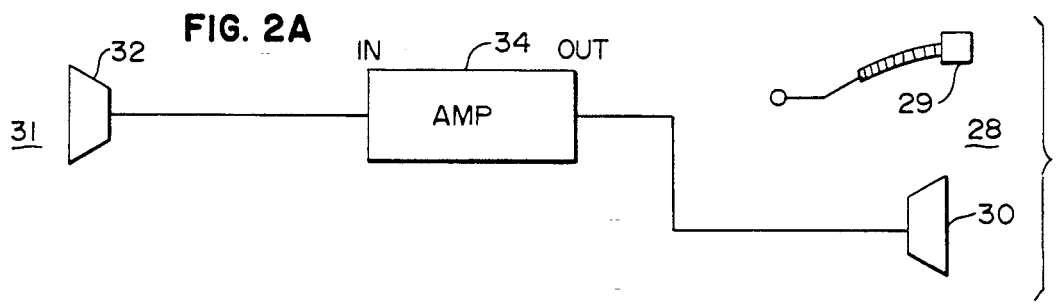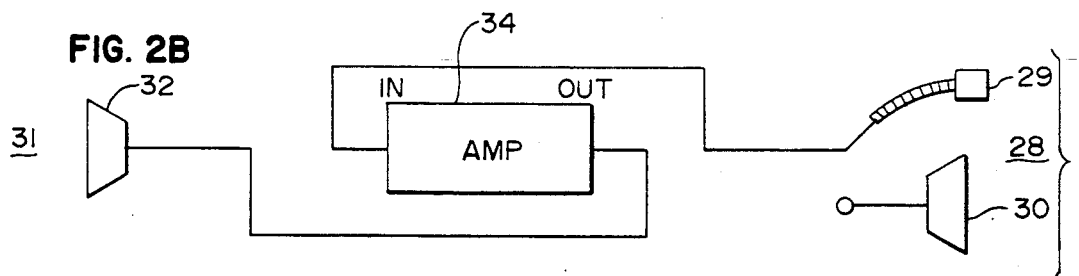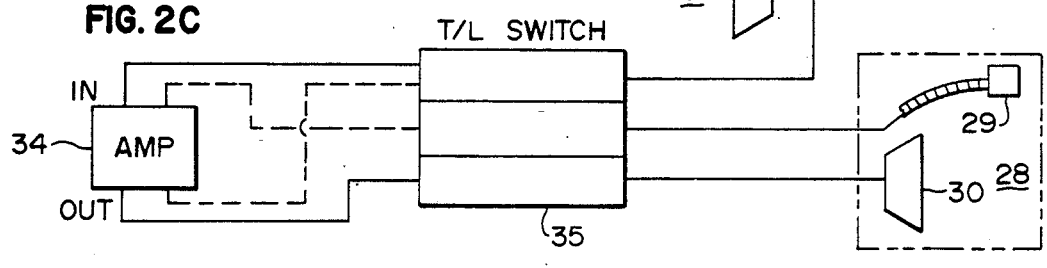

INTERCOM WITH TRANSDUCER ENCLOSURE TO ATTENUATE RESONANT FREQUENCIES

FIELD OF THE INVENTION

This invention is concerned with an intercom having a transducer enclosure to attenuate resonant frequencies and to minimize oscillation.

BACKGROUND OF THE INVENTION

A typical intercom has an amplifier, two or more stations each with a microphone and speaker or a two-way (microphone or speaker) transducer and a switch interconnecting the microphone, speaker and transducer with the amplifier for communication between the two stations. This invention is concerned particularly with an intercom where two stations are so related physically that audio feedback from the speaker at one station is coupled to the microphone of the other station, causing oscillation.

The oscillation problem has been found to be particularly troublesome with a two station intercom for a kiosk, as at a self-service gasoline facility, or a drive-up window at a bank or fast food establishment. An intercom station for the attendant in the kiosk has a microphone and speaker. A second station, outside the kiosk, has a transducer that serves both as microphone and speaker. The transducer is typically mounted in or on the wall of the kiosk. A switch, for example a voice operated switch controlled by the attendant, connects the first station microphone with the input of the amplifier and the second station transducer with the amplifier output when the attendant in the kiosk speaks, for communication from the attendant at the first station to the customer at the second station. Alternatively, when the attendant is not speaking at the first station, the switch connects the second station transducer with the amplifier input and the first station speaker to the output of the amplifier for communication from the customer to the attendant. In both conditions the intercom is subject to oscillation unless the first station has a proximity microphone, in which case oscillation is more likely to occur only when the customer is speaking to the attendant. Many installations do not, however, use a proximity microphone as they are more expensive than other microphones, and the user must be close to the microphone when speaking. Other intercom configurations are also subject to oscillation and some examples will be described below.

The air feedback system in which the intercom operates has physical elements, including the kiosk or other structure air spaces or columns and the mechanical mounting for the transducer, which are subject to mechanical resonance at one or more frequencies in the audio spectrum. These mechanical resonances reinforce the feedback energy and contribute to intercom oscillation. It is impractical to damp the mechanical vibrations of all of the physical elements which affect the intercom.

An attempt to reduce intercom oscillation by using a moving cone transducer (microphone/speaker) with a solid metal frame, isolating the rear surface of the cone, had modest success. However, this transducer construction caused a severe deterioration of audio quality.

SUMMARY OF THE INVENTION

In accordance with the invention, a sound attenuation enclosure for the second station transducer, minimizes feedback coupling of energy which would cause oscillation. More particularly, the transducer typically has a flexible cone with front and rear faces. A voice coil connected with the apex of the cone is moveable in the gap of a magnetic field. The sound attenuation enclosure covers the rear face of the flexible cone. Another feature of the invention is that the enclosure comprises an open cell foam as of a neoprene material to attenuate the resonant frequencies.

A further feature is that where the transducer has a conical frame on which the flexible cone is mounted, the sound attenuation enclosure is on a metal can secured to the rear of the frame.

Where the intercom station with separate microphone and speaker operates in a noisy location, the oscillation free operation is improved by adding a sound attenuation enclosure to the speaker.

Other features of the invention will readily be apparent from the following description and from the drawings in which:

BRIEF DESCRIPTION OF THE DRAWINGS

FIG. 1 is a sketch of a kiosk illustrating an intercom installation subject to oscillation;

FIG. 2A is a diagram of an intercom system connected to communicate from the second station to the first station;

FIG. 2B is a diagram of the intercom system connected to communicate from the first station to the second station;

FIG. 2C is a diagram of the intercom showing a switch for connecting the microphone, speaker and transducer with teh amplifier;

FIG. 2D is a diagram of an intercom having two way transducers at both stations;

DETAILED DESCRIPTION OF THE PREFERRED EMBODIMENT

Figure 2E:
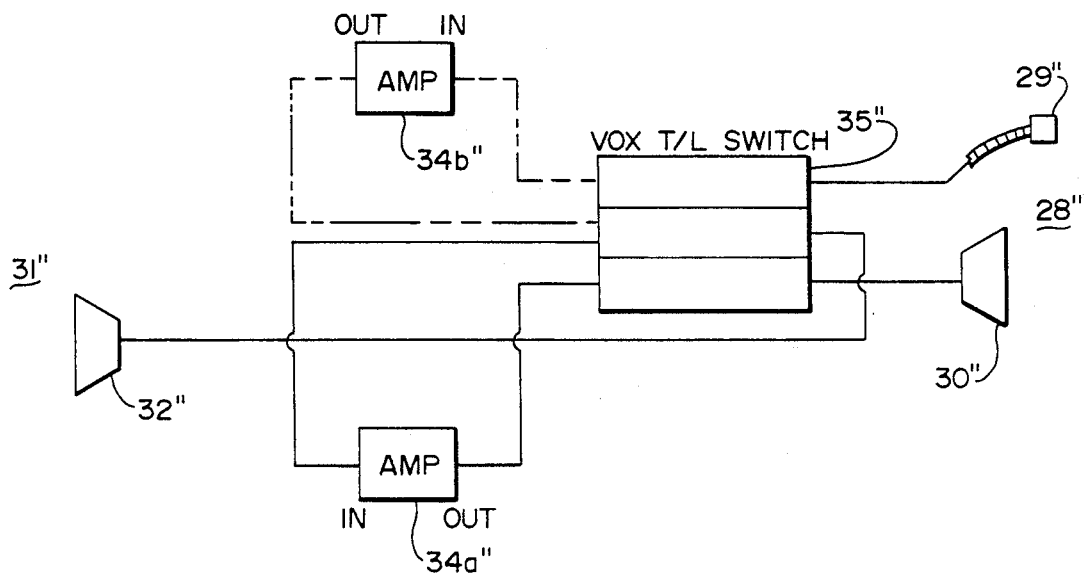
FIG. 2E is a diagram of an intercom having two amplifiers, particularly for operation in a noisy location with a voice controlled Talk/Listen switch.

The invention is shown herein with several typical intercom configurations and physical installations. It will be understood that these are illustrative and that the invention may be used with other intercoms and installations.

Turning now to FIG. 1, a kiosk 20 has a front wall 21 with a counter 22, a glass window 23 and a transaction opening 24 below the window. The side and rear walls are not shown. A roof 25 completes the kiosk structure. A first or Master intercom station 28 inside the kiosk has transducer means, a microphone 29 and speaker 30, for the attendant in the kiosk. A second or Slave intercom station 31, for the customer outside the kiosk, has a two way transducer 32 which serves both as a microphone and speaker. The transducer 32 is located in a mounting box 33 in the wall 21 of the kiosk. Alternatively, the transducer may be mounted on the kiosk wall 21 or above the window 23, as indicated in broken lines at 32a and 32b, respectively.

FIGS. 2A, B and C illustrate a typical intercom circuit. In FIG. 2A transducer 32 of Slave station 31 acts as a microphone and is connected with the input of amplifier 34. Speaker 30 of Master station 28 is connected with the output of the amplifier. The intercom provides for communication from a customer outside kiosk 20 to the attendant inside the kiosk. In FIG. 2B Master station microphone 29 is connected with the input of amplifier 34 and Slave station transducer 32 is connected with the output of the amplifier acting as a speaker. The system provides for communication from the attendant in the kiosk to the customer outside. As illustrated in FIG. 2C, the intercom includes a three section Talk/Listen (T/L) switch 35 which controls the connection of Master microphone 29 and speaker 30 and the Slave transducer 32 with amplifier 34. The T/L switch 35 is typically voice actuated by the attendant at Master station 28 to control communication. When the attendant is not speaking, the Master station is connected to receive a communication from a customer outside the kiosk as shown in solid lines in FIG. 2C, and in FIG. 2A. When the attendant at the Master station in the kiosk is speaking, T/L switch 35 connects Slave transducer 32 with the output of amplifier 34 and the Master station microphone 29 with the input of the amplifier. This circuit condition is shown in broken lines in FIG. 2C and in FIG. 2B.

With the Slave station transducer 32 transmitting, sound is coupled from the Master station speaker 30 to the transducer 32 both through the air and transaction opening 24 and through the kiosk wall 21. This can cause an undesirable oscillation which prevents effective communication between the two stations. Similarly, when the Master station 28 transmits as shown in FIG. 2B, sound is coupled from speaker 32 through the air and the kiosk wall to microphone 29. Unless a specially designed proximity microphone is used, oscillation may also occur in this circuit configuration.

Figure 3:
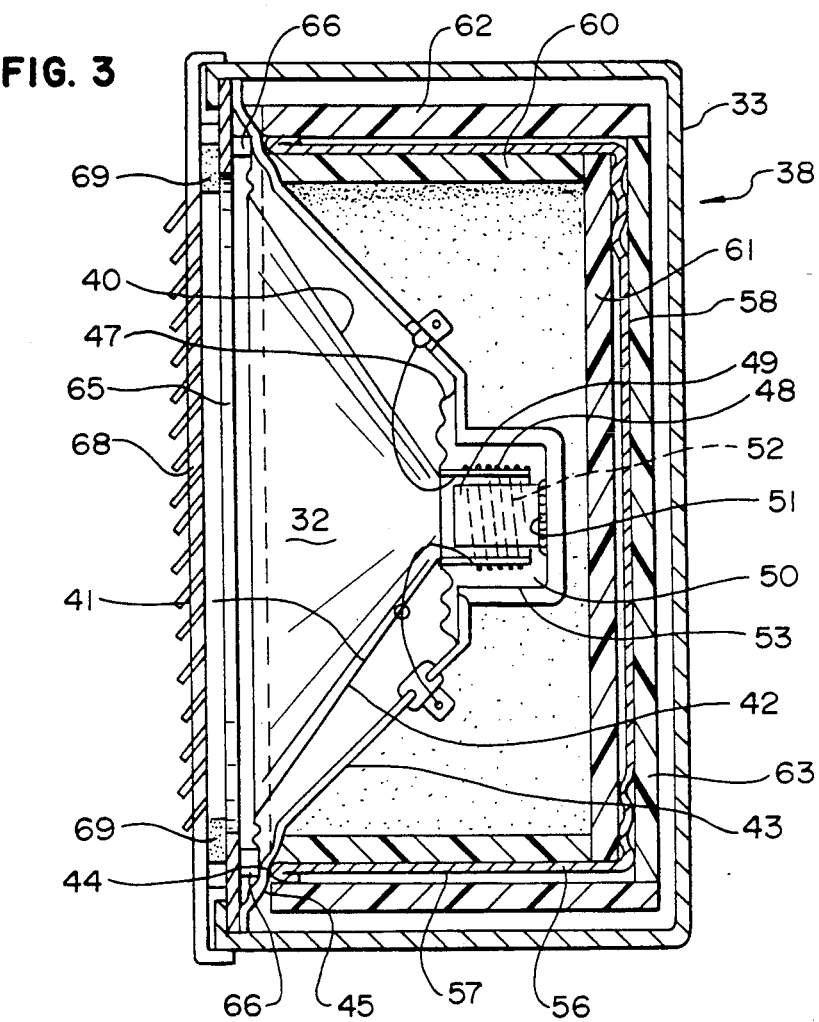
FIG. 3 is a longitudinal section through the transducer and sound attenuation enclosure.

In accordance with the invention, the Slave station transducer 32 is provided with a sound attenuation enclosure 38, FIG. 3. The transducer in the embodiment of the invention illustrated is a moving coil device that functions both as a microphone and as a speaker. The transducer has a flexible cone 40 with a front face 41 and a rear face 42. The cone is mounted in a conical frame 43 with the edge 44 of the cone secured to the outer ring 45 of the frame. The apex of the cone is secured to the frame by a flexible centering spider 47. A voice coil 48 is wound on a cylindrical coil form 49 which extends rearwardly from the cone apex into the air gap 50 of a magnetic circuit including magnet 51 and inner and outer pole pieces 52, 53, respectively. When transducer 32 acts as a microphone, sound induced vibrations of cone 40 cause movement of coil 48 in the magnetic air gap 50, inducing a current in the coil which is connected with amplifier 34. Conversely, when transducer 32 acts as a speaker, current from amplifier 34 in coil 48 causes movement of cone 40 to generate sound waves. The speaker 30 of the Master station may have the same construction.

The rear face 42 of cone 40 is exposed through windows (not shown in FIG. 3) in frame 43. The sound attenuation enclosure 38 covers the rear of the transducer, isolating the rear face 42 of cone 40 from sound waves transmitted through the air. The enclosure 38 comprises a metal can 56 having a covering of foam on both the inside and outside. More specifically, the can 56 has a side wall 57 and an end wall 58. The inner surface of the side wall 57 is covered with a rectangular foam liner 60 and the inner surface of end wall 58 is covered with a foam disc 61. The outer surface of side wall 57 is covered with a rectangular piece of foam 62 and the outer surface of end wall 58 is covered with a circular foam disc 63. An open cell neoprene foam, ¼ inch thick has been found satisfactory for the enclosure of a 3 inch speaker. Such neoprene foam is available in sheets with an adhesive coating on one surface, for easy application to the can 56. The rim of the can is secured to the rear surface of transducer frame 43 as by an epoxy adhesive.

I have found that with the sound attenuation enclosure 38 for the second or Slave station transducer, the intercom of FIGS. 1 and 2A-C is not subject to oscillation for a level of amplifier gain sufficient for communication with the normal ambient noise condition at a gasoline station or fast food installation. In a noisy location, where higher amplifier gain is necessary, it might be desirable to provide such a sound attenuation enclosure for both the Slave station transducer and the Master station speaker 30.

The transducer 32 is typically secured to a mounting plate 65 with the speaker frame isolated from the plate by a fiber ring 66. The mounting plate and transducer are secured in protective box 33 which may be mounted in or on the wall of kiosk 20. The transducer assembly is completed by a metal grill 68 secured over the mounting plate 65. Vibration of the grill is minimized by foam pads 69 secured to the mounting plate and compressed between the grill and the mounting plate.

FIG. 2D illustrates an alternate intercom circuit where both the Master and Slave stations 28', 31', respectively, have two-way transducers 30' and 32'. The direction of communications controlled by a manual T/L switch 35' at the Master station 28'. The solid line connections between T/L switch 35' and amplifier 34' show the connections for the Master receiving a communication from the Slave; and the broken line show the connections for the Master transmitting to the Slave. With this intercom configuration, it is preferable that both transducers 30' and 32' have the sound attenuation enclosure.

An intercom operating in a noisy environment may have two amplifiers, one for communication from the Slave station to the Master station and the other for communication from the Master station to the Slave station. The gain of each amplifier may be set to provide an adequate signal to be audible over the noise at the speaker location. FIG. 2E shows such an intercom with a voice-operated (VOX) T/L switch. Master station 28" has separate microphone 29" and speaker 30". Slave station 31" has a two-way transducer 32". The transducers at both stations are connected through VOX T/L switch 35" with amplifiers 34A" and 34B". When the Master station 28" receives a communication form Slave station 31" transducer 32" is connected with the input of amplifier 34a''', and the amplifier output is connected with Master station speaker 30", as shown in solid lines. When the attendant at Master station 28" speaks, the switch 35" operates, connecting the microphone with the input of amplifier 34b" and transducer 32" with the output of the amplifier, as shown in broken lines, for communication from the Master station to the Slave station. The Slave station transducer 32" is provided with a sound damping enclosure. Moreover, if the Master station location 28″ is exceptionally noisy, a sound damping enclosure is provided for speaker 30″ to enhance the oscillation free operation.

Figure 2F:
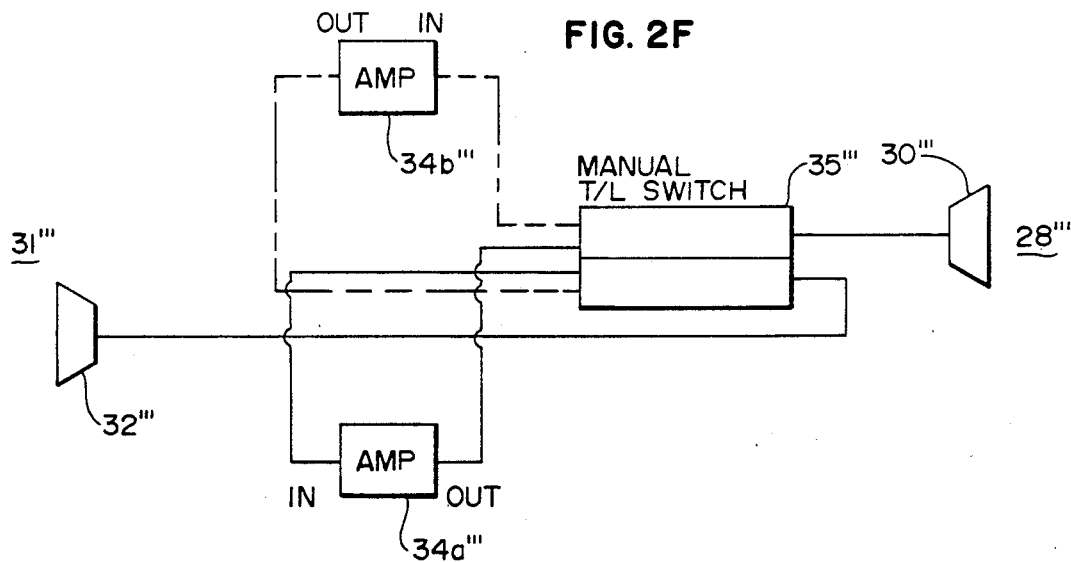
FIG. 2F is a diagram of an intercom having two amplifiers, as in FIG. 2E, with a manual T/L switch.

A two amplifier system with two-way transducers at both the Master station 28‴ and 31‴ is shown in FIG. 2F. Here, the transducers 30‴ and 32‴ are connected through a manual T/L switch 35‴ with amplifiers 34a‴ and 34b‴. As above, the connections of the transducers for communication from the Slave station 31‴ to the Master station 28‴ are shown in solid lines and the connections for communication from the Master station 28‴ to the Slave station 31‴ in broken lines. Both two-way transducers 30‴ and 32‴ are provided with sound damping enclosures.

Figure 4:
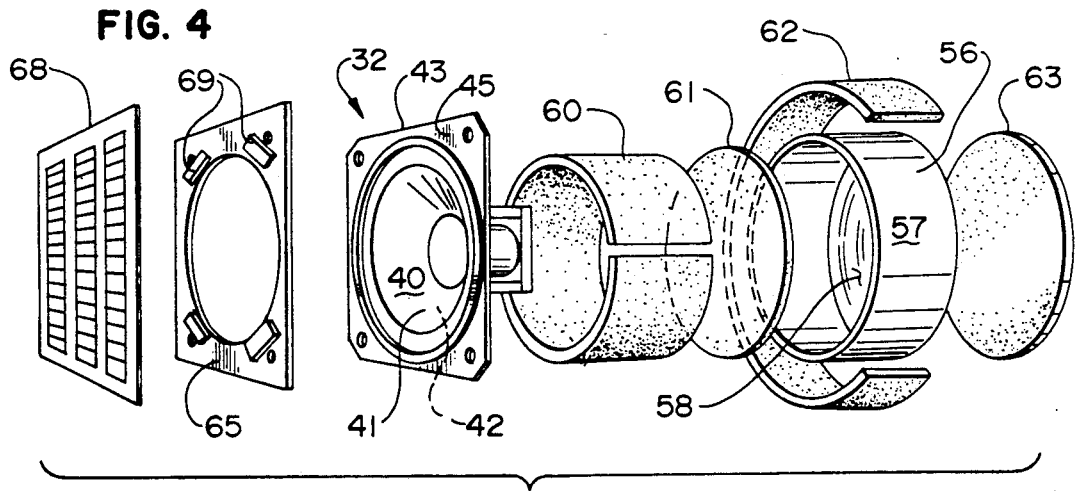
FIG. 4 is a perspective exploded view of the transducer and sound damping enclosure.
Figure 5:
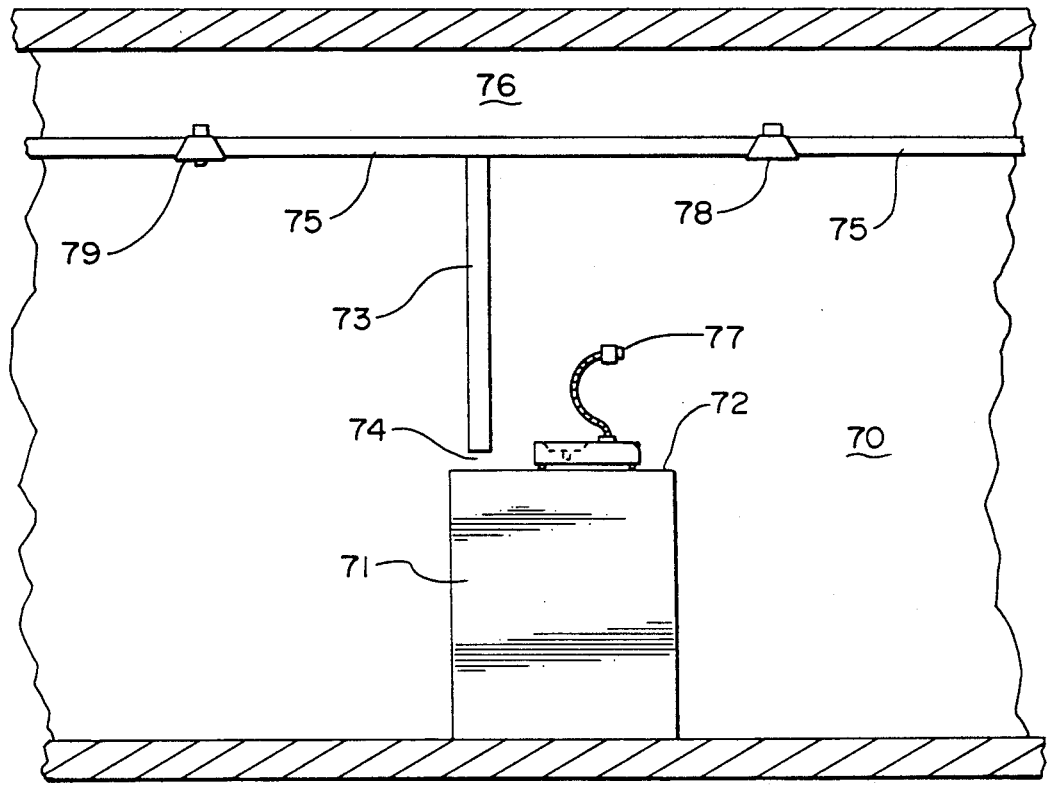
FIG. 5 is a diagram of an alternative kiosk installation.

A kiosk installation which is typical for a ticket office inside a building, as an assembly hall or stadium, is shown in FIG. 5. The kiosk 70 has a front wall 71 with a counter 72 and window 73. An access opening 74 between the window 73 and counter 72 allows the transfer of articles between an attendant in the kiosk 70 and the customer outside. The building in which the kiosk 70 is located has a false or dropped ceiling 75 with an air space 76 above the ceiling. The intercom system has a microphone 77 for the Master station in the kiosk 70 and a speaker 78 mounted in the ceiling 75. The Slave station transducer 79 is similarly located in the ceiling 75 above and outside the kiosk glass wall 73. A short and direct air coupling exists through the air space 76 above the ceiling. The sound attenuation enclosure of FIGS. 3 and 4 for at least the Slave station transducer 79 enables oscillation free operation.

Figure 6:
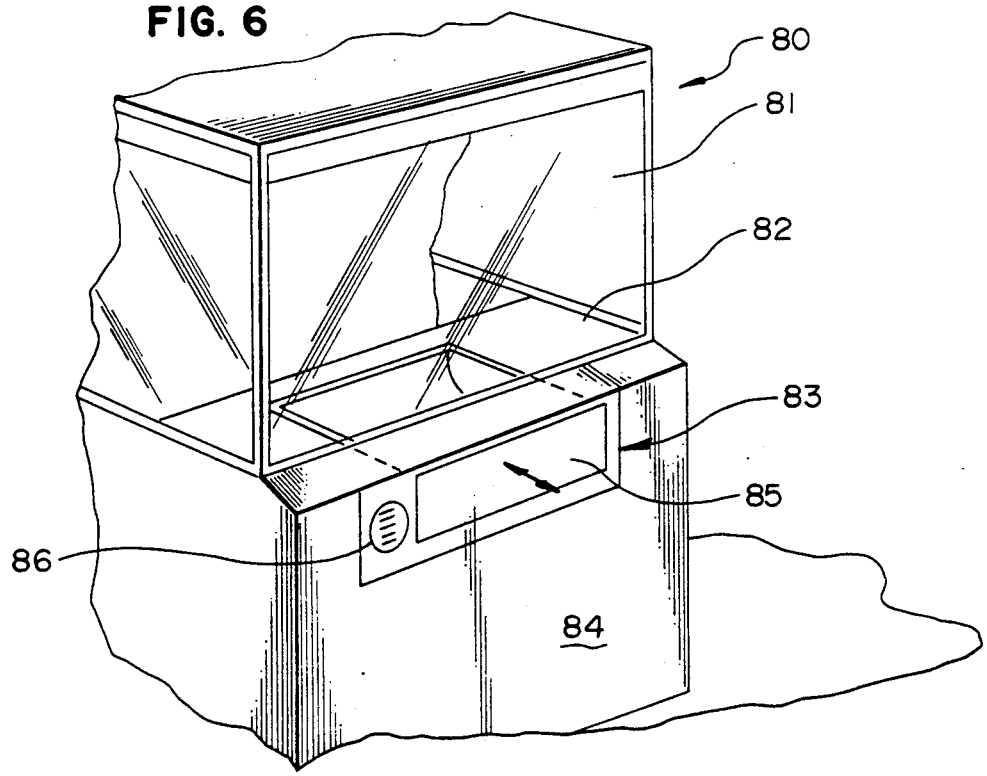
FIG. 6 is a diagrammatic view of yet another kiosk installation.

FIG. 6 illustrates a cashier's kiosk 80 where the window 81 extends upwardly from the counter 82. A drawer unit 83 set in wall 84 has a drawer 85 movable under the window 81 to pass articles between an attendant inside the kiosk and a customer outside. The transducer 86 for the Slave station of an intercom is located in the drawer unit 83. Transducer 86 has the sound attenuation enclosure of FIGS. 3 and 4; and the intercom operates without oscillation.

I claim:

1. In an audio intercom with
a first station having transducer means and an amplifier with input and output,
a second station having a transducer which serves both as a speaker and microphone, and
a switch in the first station having a first condition with the first station transducer means connected with the input of the amplifier and the second station transducer connected with the output of the amplifier to communicate from the first station to the second station, and the switch having a second condition with the second station transducer connected to input of the amplifier and the first station transducer means connected to the output of the amplifier to communicate from the second station to the first station, the second station transducer having a flexible cone with front and rear faces, and a voice coil moveable in an air gap of a magnetic field, the intercom being subject to audio resonance and feedback causing oscillation, the improvement in which the second station transducer has:
a sound attenuation enclosure covering the rear face of said flexible cone.

2. The intercom of claim 1 in which the sound attenuation enclosure comprises neoprene foam.

3. The intercom of claim 2 in which said neoprene foam enclosure is open cell foam.

4. The intercom of claim 1 in which said second station transducer has a conical frame which opens frontwardly with the flexible cone mounted inside said frame and said sound attenuation enclosure mounted outside said frame.

5. The intercom of claim 4 in which said sound attenuation enclosure includes a can secured to the outside of said frame, with said neoprene foam enclosure secured to said can.

6. The intercom of claim 5 in which said can is of metal with an epoxy adhesive securing the can to the frame.

7. The intercom of claim 5 in which said can is of metal and having an adhesive layer securing the neoprene foam enclosure to the can.

8. The intercom of claim 5 in which said neoprene foam enclosure is a liner of said can.

9. The intercom of claim 5 in which said neoprene foam enclosure is a cover of said can.

10. The intercom of claim 5 in which said neoprene foam enclosure is a liner and cover of said can.

11. The intercom of claim 5 in which said can has a side wall and an end wall and the foam enclosure includes a first segment wrapped on said side wall and a second segment covering said end wall.

12. The intercom of claim 5 in which said transducer of said second station is mounted in a metal box.

13. The intercom of claim 5 in which said transducer of said second station has a metal grill extending across the front of the cone, and including a pad engaging said grill to damp vibration of the grill.

14. The intercom of claim 13 including a transducer mounting plate with the transducer of said second station secured to one side and said grill secured to the other side, and a plurality of foam damping pads on said mounting plate and engaging said grill to damp vibrations therein.

15. The intercom of claim 1 in which the first station transducer means comprises a microphone and a speaker, and the switch in its first condition connects the microphone with the input of the amplifier and in its second condition connects the speaker with the output of the amplifier.

16. The intercom of claim 15 in which said switch is sound powered by sound picked up by said microphone.

17. The intercom of claim 1 installed in a kiosk with said first station inside the kiosk for an attendant and said second station outside said kiosk for a customer.

18. The intercom of claim 17 in which said kiosk has a wall and said second station transducer is mounted in said wall.

19. The intercom of claim 17 in which said kiosk has a wall and said second station transducer is mounted on said wall.

20. The intercom of claim 17 in which said kiosk is in a room having a drop ceiling with an overhead air space, the first station speaker and the second station transducer both being mounted in said ceiling.

21. The intercom of claim 17 in which said kiosk has a drawer assembly with a moveable drawer for passing articles between an attendant inside the kiosk and a customer outside the kiosk, with said second station transducer mounted in said drawer assembly.

22. The intercom of claim 1 where the first station transducer means is a microphone and speaker, the speaker has the construction of the second station transducer, and including a sound attenuation enclosure covering the rear face of the cone of the first station speaker.

23. The intercom of claim 1 where the first station has a two-way transducer with the construction of the second station transducer, and including a sound attenuation enclosure for the first station transducer.

* * * * *